United States Patent [19]
Hori et al.

[11] Patent Number: 5,635,091
[45] Date of Patent: Jun. 3, 1997

[54] TIPS FOR WELDING AND THEIR MANUFACTURING PROCESS

[75] Inventors: Katsuyoshi Hori; Nobuwo Nakazawa; Yosiaki Matsumura; Yukio Hosono; Tetsuji Terada; Toshiharu Nagashima; Yuji Futami; Toshiaki Takuwa, all of Kure, Japan

[73] Assignee: Babcock-Hitachi Kabushiki Kaisha, Tokyo, Japan

[21] Appl. No.: 230,687

[22] Filed: Apr. 21, 1994

[30] Foreign Application Priority Data

| Apr. 21, 1993 | [JP] | Japan | 5-094460 |
| Feb. 28, 1994 | [JP] | Japan | 6-029966 |
| Apr. 13, 1994 | [JP] | Japan | 6-074818 |

[51] Int. Cl.⁶ ................................. B23K 9/24
[52] U.S. Cl. ...................... 219/137.61; 219/136
[58] Field of Search .................. 219/137.61, 136

[56] References Cited

U.S. PATENT DOCUMENTS

| 2,379,470 | 7/1945 | Baird | 219/136 |
| 2,756,310 | 7/1956 | Galbraith | 219/137.52 |
| 2,965,746 | 12/1960 | Cresswell | 219/137.2 |
| 3,025,387 | 3/1962 | Kinney | 219/137.61 |
| 3,038,059 | 6/1962 | Hinrichs | 219/137.61 |

FOREIGN PATENT DOCUMENTS

| 0042311 | 12/1981 | European Pat. Off. . | |
| 3330335 | 3/1985 | Germany . | |
| 5-96376 | 4/1919 | Japan | 219/137.61 |
| 56-142880 | 10/1981 | Japan . | |

OTHER PUBLICATIONS

Patent Abstracts of Japan, vol. 16, No. 137 (M–1231), Apr. 7, 1992, and JP–A–03 297 574 (Babcock Hitachi KK), Dec. 27, 1991, *abstract*.

Patent Abstract of Japan, vol. 13, No. 193 (M–822), May 9, 1989, and JP–A–01 018 582 (Masami Fujimoto) Jan. 23, 1989, *abstract*.

*Primary Examiner*—Clifford C. Shaw
*Attorney, Agent, or Firm*—Fay, Sharpe, Beall, Fagan, Minnich & McKee

[57] ABSTRACT

An excellent welding tip in the feed stability of a wire, in the release capacity of foreign matter, and in the stability of current control, and a process for manufacturing such a tip economically, is achieved in accordance with a sectional shape of a guide hole opened and provided to a welding tip. The sectional shape is derived by forming a wire in a passable non-circular shape. The sectional shape of the guide hole may be a polygonal or elliptic shape, or approximately so. In the case of making the sectional shape of the guide hole polygonal, it is more preferable to make it a polygon circumscribing on a circle, for example, such a polygon circumscribing on a larger circle than the outer diameter of the wire to be inserted into the guide hole by 0.02–0.20 mm in diameter. Specifically, it is preferable to arrange the sectional shape as a triangle.

31 Claims, 7 Drawing Sheets

TIPS FOR WELDING AND THEIR MANUFACTURING PROCESS

BACKGROUND OF THE INVENTION

1. Field of the Invention

The present invention relates to a welding wire-guiding tip, which hereinafter may be called as a welding tip for automatic arc welding equipment. Specifically, it relates to the structure of a wire guide hole opened to the tip described above.

2. Description of the Related Art

A wire to be used as a conventional electrode for gas metal arc (abbreviated as GMA thereafter) welding, and a filler wire to be used in non-consumable electrode arc welding such as tungsten inert gas arc (abbreviated as TIG thereafter) welding, have round shapes in cross section, and a guide hole of the welding tip for guiding the wire to weld portion has each round shape in cross section.

Figure 10:
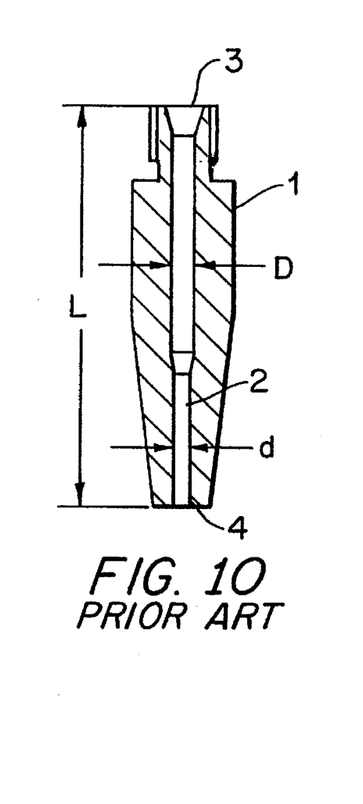
FIG. 10 is a sectional view showing a welding tip known in the prior art as a first example.

FIG. 10 is a sectional view showing a current contact tip for the GMA welding and its guide hole 2 both of which have been known in the prior art. Usually, the length L of a tip 1 is about 40 mm, and a stepwise round guide hole 2 whose diameter is larger on the side of a tip inlet portion 3 and smaller on the side of a tip outlet portion 4 is provided at the center portion in its radial direction. The diameter D of a large diameter portion is set to a larger value than the diameter of the wire described above by about 1 mm, and the diameter d of a small diameter portion is set to a larger value than the diameter of the wire described above by 0.2–0.4 mm, for example, in the case that the diameter of a wire passing through it is about 1.2 mm. Chromium-copper or beryllium copper are normally used as the material of the tip 1 for welding to the wire for GMA from the view points of abrasion resistance and current contact. The wire is supplied from the side of the tip inlet portion 3 in a more or less bent condition so that the current contact may be firmly carried out at the tip outlet portion 4.

Figure 11:
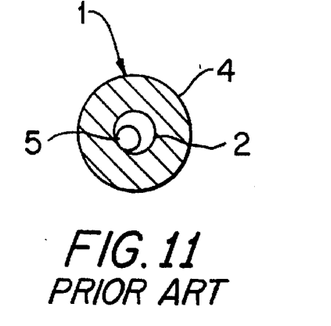
FIG. 11 is a sectional view showing a condition of passing a wire through the welding tip of the first prior art example.

FIG. 11 is a sectional view showing a tip outlet 4 and illustrates such a condition that a wire 5 passes through the guide hole 2 of the tip 1. The current contact is carried out in the form that the wire 5 having a round shape in cross section may be brought into contact with the inside of the guide hole 2 having a circular shape in cross section at one point between a line and a point.

This welding tip 1 is mounted on an unillustrated welding torch, which is used in semiautomatic welding or loaded on a welding robot. In the case that the welding torch 1 is loaded on the welding robot, the wire 5 is usually taken out of the tip 1 while the condition at the time of welding is assumed, the welding route is stored by tracing the welding groove at the tip of the wire 5, and then, the welding is carried out by play backing. In the process for tracing the welding groove, however, as the contact pressure by the welding groove is applied on the wire 5, the contact point between the guide hole 2 and the wire 5 is varied. Then, the position at the wire tip at the time of playing back during welding and the initial position at the wire tip may be varied sometimes. It is easy for the tip of the wire 5 come out of a target position during welding, and the beads are zigzagged.

Therefore, in order to reduce such an inconvenience, it is desirable that the wire 5 come out in a straight condition as much as possible and from the guide hole 2 having less clearance. However, as some clearance is necessary in order to feed the wire 5 smoothly, and if the straight wire 5 is arranged as to pass through a straight guide hole, the contacting energized position between the guide hole 2 and the wire 5 cannot be fixed and stable welding work becomes difficult. Therefore, when such a straight wire is adapted, there is an example disclosing a device for pushing a wire to an energized tip hole surface horizontally by means of a spring (Japanese Patent Application Laid-Open No. 64-18582).

Incidentally, the wire 5 fed to the welding tip 1 is not always clean, but it is sometimes attached with rust on its surface, chips produced by the contact between the wire and the internal surface of the conduit or the tip 1, and the released matter produced at the time of passing the feed roller in a wire feeding apparatus. The surfaces of mild steel wires are protected by copper plating for rust inhibiting. In this case, it is sometimes attached with the released matter from metal plating in addition to the foreign matter described above. This foreign matter is brought to the welding and tip 1 along with the wire 5 and plugged between the guide hole 2 and the wire 5, resulting in preventing the smooth supply of the wire 5 or a current contact to the wire 5. As a result, in the case of GMA welding, erratic arc is generated frequently and there are some problems such as frequent spatter generation and arc instability. There were some cases that the tips and the wires have been frozen to each other by the spark between them at the beginning of welding.

Since the problems described above easily occur as a guide hole diameter is made smaller and close to a wire diameter, the guide hole diameter is usually set larger than the wire diameter by approximately 0.2–0.4 mm.

Figure 12:
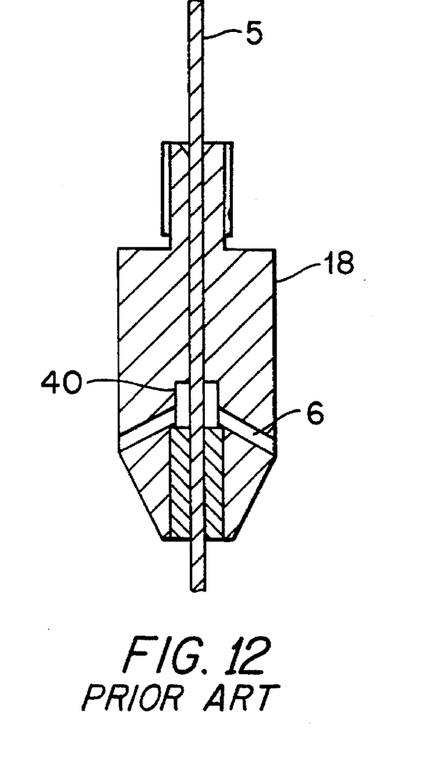
FIG. 12 is a sectional view showing a welding tip known in the prior art as a second example.

Incidentally, for extracting foreign matter smoothly, Japanese Utility Model Application Laid-Open No. 56-142880 proposed a structure as shown in FIG. 12. A space 40 is arranged on the way to the guide hole 2 and a horizontal hole 6 passes through an energizing tip 18 from the space 40 to an outer surface thereof to release the foreign matter from it. Even by means of this method, however, the plugging-up of the foreign matter still occurs when the hole diameter at the tip of the current contact tip is made smaller than that of a usual value, and the guide hole diameter itself is still its usual value without any change. Therefore, there has been no improvement in the rattle of the wire 5 within the guide hole 2.

With reference to the ceramic guide tips used in hot wire TIG welding, the detailed description will be given in the following. In the hot wire TIG welding, some insulating tips of a ceramic matter for a filler wire guide are often disposed after the wire passes the current contact tip in order to make an extension portion for causing heat by energizing the filler wire long and to make the fluctuation of the tip of the wire less.

Figure 13:
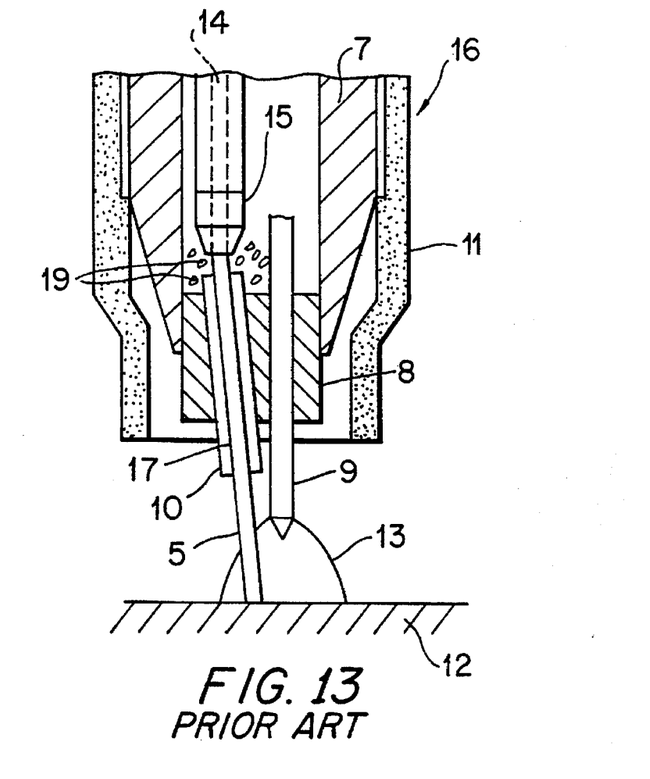
FIG. 13 is a schematic sectional view showing a welding torch known in the prior art.

FIG. 13 is a sectional view showing a structure of the tip portion of a TIG torch previously proposed by the present inventors (disclosed in Japanese Patent Application Laid-Open No. 3-297574). This torch 16 is arranged so that a filler wire 5 may be fed in parallel with and close proximity to a tungsten electrode 9. As a result, the circumference of the torch can be made small and the execution of welding in a narrower space become easy. This has such an effect of enhancing the tolerance in arc length and remarkably improves the practicability of a TIG welding robot. In addition, such a hot wire method by energizing the wire 5 for increasing the quantity of wire deposition is adapted.

In FIG. 13, an insulating guide tip 10 for supplying the filler wire 5 and the tungsten electrode 9 are each held by an exchangeable mechanism, e.g., a screw stopper, to a load tip 8 mounted on the edge of a hollow torch body 7. In addition, a shield nozzle 11 produced by ceramics is inserted into the outer circumference of the edge of the torch body 7. Further, there is a passage (unillustrated) for argon as a shield gas in the inside of the torch body 7 so as to be blown out into the inner circumference of the edge of a nozzle 11. Water cooling pipes (unillustrated) having a conductive double tubular structure made of copper are provided to the inside of the hollow torch body 7, and the tip of the outer water cooling copper pipe is connected to the load tip 8. Therefore, the water cooling copper pipe cools the load tip 8 with cooling water and at the same time, an arc 13 can be generated between the tungsten electrode and a base metal 12 by energizing the load tip 8 and the tungsten electrode 9. A wire guide tube 14 is disposed in the axial direction of the nozzle 11 in the inside of the torch body 7, and a load tip 15 for use of wire is placed at the lower tip of it. The wire 5 reaches a base metal by passing through the current contact tip 15 and the wire insulating guide chip 10.

In the TIG torch 16 of FIG. 13, it is desirable to supply the wire 5 to just under the arc 13 as much as possible in order to make it easy to operate the TIG torch. On the contrary, while automatic welding is carried out, the wire 5 is detached from a base metal 12 due to a certain reason and a globule is often formed at an edge thereof. In such a case, the globule is brought into contact with the tungsten electrode 9 and the arc 13 is disturbed, resulting in inability of welding work, if the tungsten electrode 9 and the wire 5 come in too close proximity to each other. In order to prevent this, it is preferable to make the gaps in surfaces between the tungsten electrode 9 and the wire 8 wider to some extent.

In the case that there is no clearance between the wire 5 and the guide hole 17 and that the wire 5 is straight, the gap between the tungsten electrode 9 and the wire 5 may be at shortest 0.5 mm or more and more preferably approximately 1 mm. However, since a wire guide hole 17 in the insulating guide chip 10 had its round shape in cross section of 1.4 mm in diameter corresponding to the wire of 1.2 mm in diameter, there were some cases that the globules were brought into contact with the tungsten electrode 9 unless the gap actually had to be apart from each other by 1.5 mm or more in an average setting condition, because of the rattle between the wire 5 and the guide hole 17 and non-uniformity in curving tendencies of the wire 5. Then, there was such a problem that there was a great difference in arc heat between when the wire 5 was at the remotest apart and when it was in the closest proximity to the tungsten electrode 9, and accordingly, it was difficult to control the fusion condition of the wire.

From such reasonings, it has been desired to diminish the rattle between the wire 5 and the guide hole 17 by making the diameter of the guide hole 17 in the insulating tip 10 for guiding the wire 5 to be as small as possible so as to keep the distance between the wire 5 and the tungsten electrode 9 constant. When the diameter of the guide hole 17 was set 1.3 mm more or less corresponding to the wire 5 of 1.2 mm in diameter, there were some disadvantages in that the guide hole 2 was plugged up by foreign matter such as chips from copper plating, resulting in the inability to feed the wire, the wire 5 was chipped at the entrance of the guide tip 10, and the resulting chips were trapped by the side of the torch body 7. Further, the contact tip 15 and the tungsten electrode 9 were shortened with respect to each other to generate an arc within the torch body 7, resulting in damaging the torch 16. Accordingly, it was necessary to make the diameter of the guide hole 17 1.4 mm or more and clean periodically the torch body 7 so that no foreign matter 19 might be trapped thereby.

In the prior art described above, there is a disadvantage in that the tip position of the wire 5 broadly fluctuates in accordance with the supply of the wire due to the large gap between the wire 5 and the guide hole 2. Further, there still remains a fundamentally unresolved problem that in such a method as extracting any foreign matter from the horizontal hole 6 provided to the tip 1, the resulting tip structures are complicated, the tips become expensive and the plugging-up of the tips due to the invasion of the foreign matter is generated.

In the method of inserting round wire in cross section into the energizing tip having a round guide hole in cross section, however, there was a disadvantage in that continuous energizing can hardly be maintained and the arc off on the basis of momentary bad energizing is easily generated since the wire 5 and the internal surface of the guide hole 2 are brought into contact with each other on the contact between a line and a point. Since a large current flows at one point, there is such a risk that there may be a spark between the wire and the tip in the case of energizing start under the plugged condition between the wire and the tip and the wire may be fused into the tip, resulting in the inability of feeding the wire.

SUMMARY OF THE INVENTION

It is accordingly a first object of the present invention to provide an energizing tip having a simple structure and produced in an inexpensive coat so that no tip plugging-up by foreign matter such as deposits from plating is generated and energizing is well done even though the fluctuations of the wire tip position may be set small by making the gap between the wire and the tip hole comparatively small.

It is a second object of the present invention to provide a tip composed of an insulating ceramic having a simple structure without generating any tip plugging-up by foreign matter such as deposits from copper plating even though the fluctutation of the wire tip position may be lessened by making the gap between the wire and the tip hole comparatively small.

It is a third object of the present invention to provide a method for inexpensively manufacturing the tips having these functions.

The first and second objects described above can be achieved by forming the guide hole to have a non-circular sectional shape capable of receiving the wire therein.

The sectional shape of the guide hole described above may be a polygon, elliptic or its approximate shape as well. In the case of setting the sectional shape of the guide hole as a polygon, it is preferable to set it as a polygon to be circumscribed on a circle, such as a polygon whose diameter is circumscribed on a larger circle whose diameter is larger than the outer diameter of a wire to be inserted into the guide hole by 0.02–0.20 mm. Specifically, it is preferable to set it in a triangular shape. On the other hand, in the case of making the sectional shape of the guide hole elliptic, it is preferable to make the minor axis of the elliptical guide hole larger than the outer diameter of the wire to be inserted into the guide hole described above by 0.02–0.20 mm.

In any case, in order to firmly extract the foreign matter, it is particularly preferable to set a shape having space enough to inscribe in a circle having one-third the diameter of the outer diameter of the wire described above between two surfaces exactly brought into contact with the wire described above and the circumferential surface of the wire described above, when a wire having a round shape in cross section is inserted into the guide hole and the circumferential surface of the wire described above is exactly brought into contact with two surfaces composed of the guide hole described above.

The whole of a welding tip of the present invention can be integrated into copper or copper alloy or into an insulating ceramic having a heat resistance. Further, the welding tip is composed of the main body of the tip and the edge member embedded into the tip of the main body of the tip described above and the guide hole described above can be opened in this edge member as well. Also, the welding tip is composed of the main body of the tip and an edge member made of a heat resistant ceramic of 25 mm or more in length successively provided to the tip of the main body of the welding tip described above, and the guide hole described above can be opened in both of the main body of the tip and the edge member.

In addition, it is desirable to provide a device for firmly sliding a wire in contact with the internal surface of the guide hole of the tip described above. For example, it is possible to bend the center line of the guide hole in the transferred direction of the wire or to constitute the tip described above so that an elastic member may be exactly brought into contact with the outer surface of the wire inserted into the guide hole by providing the elastic member protruding into the outside of the guide hole in part.

In addition, the third object described above can be achieved by taking a procedure with respect to a copper tip, that is: the core wire having a non-circular shape in cross section is inserted into a cylindrical material of a copper or its alloy, the internal surface of the cylindrical material described above is tightly pressed to the outer surface of the core wire described above by applying an outer surface on the cylindrical material, and then a welding tip having a guide hole with a non-circular cross-sectional shape can be formed by taking out the core wire described above.

When the guide hole is made in a non-circular (e.g., triangular, rhomboid or elliptic) shape, a large clearance can be formed between the circumferential surface of an inserted wire and the internal surface of the guide hole, even though a wire having the maximum diameter may be inserted into the guide hole. Therefore, the plugging by foreign matter can be decreased and at the same time the rattle of the wire can be reduced.

Figure 14:
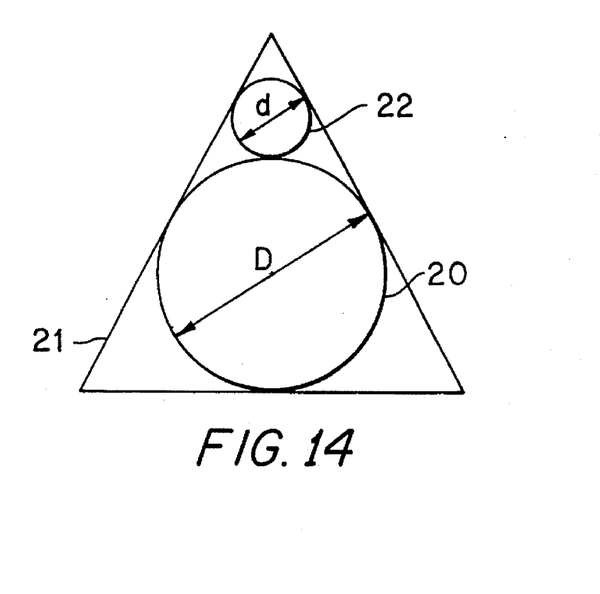
FIG. 14 is an explanatory view showing the operation of the welding tip guide hole of the present invention.

For example, considering a guide hole in a form of regular triangle 21 having an inscribed circle 20 with a diameter D as shown in FIG. 14, a diameter d of a circle 22 inscribing on its inscribed circle 20 and one corner portion of the triangle 21 is equal to D/3. Therefore, assuming D as 1.2 mm, then d is equal to 0.4 mm. This shows that a spherical foreign matter of 0.4 mm in diameter can pass through the guide hole, even through the guide hole may be such a triangle that can almost guide a wire of 1.2 mm in diameter. As described above, in the case of inserting a wire of 1.2 mm in diameter into the guide hole having a circular shape in cross section, the normal guide hole is formed in a diameter of 1.4 mm and accordingly, the diameter of the passable spherical foreign matter is only 0.2 mm. However, when the guide hole is set in a form of a triangle, the rattle of the wire is reduced and at the same time, any foreign matter layer larger than chipped deposits can be released through the guide hole, resulting in no generation of the wire plugging-up and irregular feeding.

In the current contact tip having a triangular guide hole, the wire is brought into contact with at least two points of the guide hole when being pushed against one corner of the guide hole, and therefore the resulting energizing can be carried out with more stability in comparison with the case of the circular guide hole where the energizing contact is carried out at one point. As no foreign matter is accumulated around the guide hole, no poor contact occurs by the invasion of foreign matter into the contact gap between the wires and the tips.

In the tip assembly where the wire is inserted into a V channel and pressed with an urging member, a triangular guide hole can be formed, and, at the same time, the wire is pressed on both sides of the triangular hole to be brought into contact therewith.

Therefore, energizing contact is carried out with more stability in comparison with that in the case of the circular guide hole where energizing contact is carried out at one point. The wire is heated up to high temperatures and corrected straight, and the vibration of the wire can be also prevented.

DESCRIPTION OF THE PREFERRED EMBODIMENTS

Figure 1:
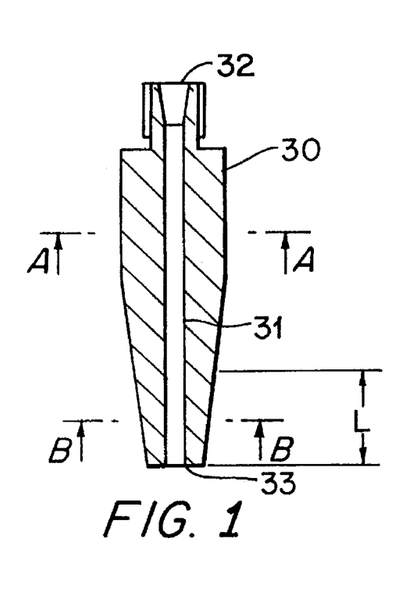
FIG. 1 is a sectional view showing a welding tip as a first preferred embodiment of the present invention.
Figures 2, 3:
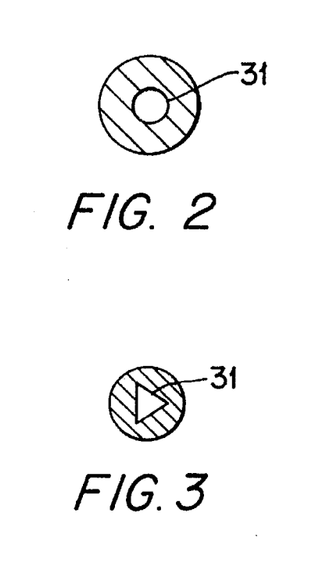
FIG. 2 is a sectional view of FIG. 1 taken along line A—A.
FIG. 3 is a sectional view of FIG. 1 taken along line B—B.

Referring now to FIGS. 1 through 3, the first preferred embodiment of the present invention will be explained in the following. FIG. 1 is a central sectional view showing a current contact tip for GMA welding use according to this embodiment. FIG. 2 is a sectional view of FIG. 1 taken along line A—A, and FIG. 3 is a sectional view of FIG. 1 taken along line B—B, respectively.

In the welding tip of the present embodiment, a guide hole 31 for inserting a wire of 1.2 mm in diameter therein is opened on the axial core of the main body of a 40-mm long tip 30 made of chromium copper. An inlet 32 of this guide hole 31 is arranged to have a taper surface spreadingly opened outward so that the wire may be easily inserted therein. From this inlet 32 at one end of the hole, a wire is inserted and comes out of the outlet 33 at the other end of it. During welding work, an energizing is carried out by bringing the wire into contact with the tip 30. This guide hole 31 is a round hole of 3.6 mm in diameter between the inlet 32 and the intermediate point and for the portion of L=10 mm on the side of the outlet 33, the cross section thereof forms a regular triangle circumscribing on a circle of 1.25 mm in diameter. However, each corner position of the triangle is in a form of a smaller curvature than 0.2 R.

Since the outlet side of the guide hole 31 is formed in a regular triangular shape circumscribing on a circle of 1.25 mm in diameter in the welding tip of the present embodiment, a clearance between the circumferential surface of the wire and the internal surface of the guide hole 31 becomes approximately 0.1 mm in the case of inserting a wire of 1.2 mm in diameter. Therefore, the rattle of the wire during wire feeding can be lessened in comparison with the prior art welding tip having a round guide hole in cross section.

Then, as explained in FIG. 14, at each corner portion of the triangular guide hole, a clearance that can accommodate a spherical piece of foreign matter of at least 0.4 mm in diameter is formed, and at the portion between the inscribed circle and the diameter of the wire, a clearance that can accommodate a spherical foreign matter of 0.45 mm in diameter is formed. Therefore, foreign matter such as deposits from copper plating, chips and refuse, can be smoothly released through three corner portions in the guide hole of the triangle.

Also, in the case that the guide hole portion in a triangular form is longer, the resulting frictional resistance becomes larger. Therefore, it is desirable that the guide hole portion is shorter. However, if it becomes shorter, the desired accuracy at the tip of the wire becomes worse. Although this may raise a question, there is no problem in practical use because the fluctuations at the tip of the wire of 20 mm in extension length can be controlled within 0.8 mm, if the length at the outlet side of the tip is 7 mm or more. In the guide hole of the triangle, however, each surface stops the moving of the wire in the traverse direction by clamping it, and it thus has a function as a clamping and stopping surface for forming a clearance in the moving direction of the wire. Then, the object of this application can be achieved as a tip having the guide hole composed of these clamping and stopping surfaces.

The tip 30 shown in FIG. 1 can be prepared by fixing the one end of a tip material composed of chromium-copper in an approximate shape of the almost predetermined tip having a circular hole of 3.6 mm in diameter, applying to a swaging process by pressing dies against the outer circumference of the other end thereof while inserting a regular triangular hard wire in cross section into the circular hole described above, pressing the internal surface of the material to the regular triangular hard wire in cross section, and by drawing the hard wire described above.

Figure 15:
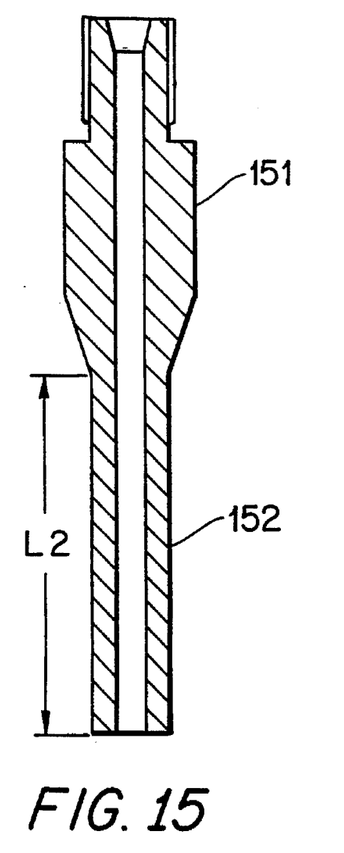
FIG. 15 shows a sectional view of a welding tip material to be used in the present invention.
Figure 16:
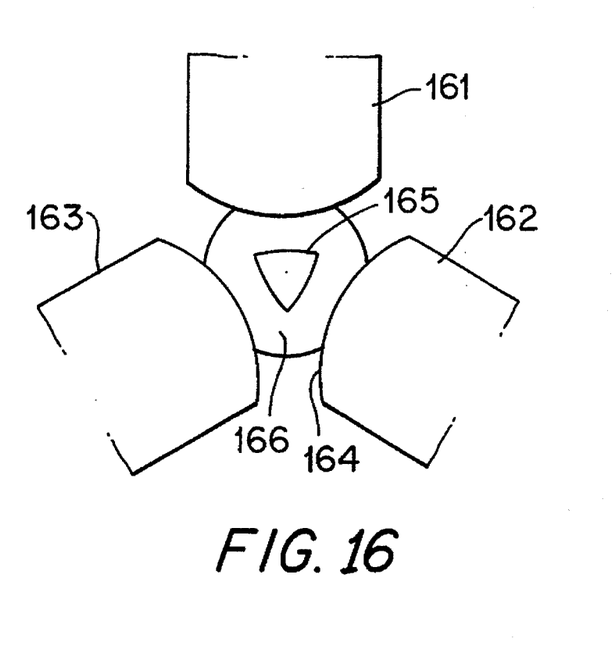
FIG. 16 shows a plan view explaining a process for manufacturing of the welding tip of the present invention.
Figure 17:
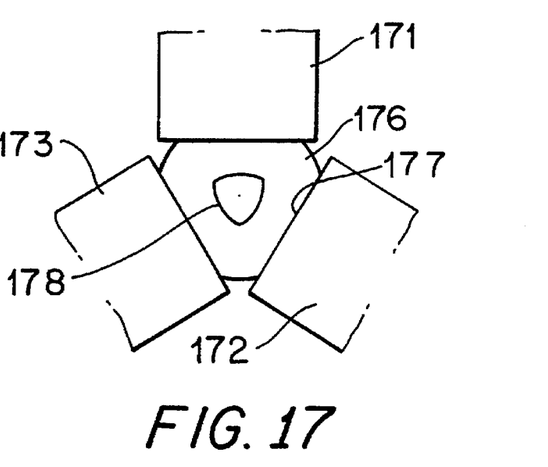
FIG. 17 shows a plan view explaining another process for manufacturing of the welding tip of the present invention.

FIGS. 15 through 17 show another preferred embodiment of the present invention. FIG. 15 shows a sectional shape of a tip material 151, which has been processed into nearly the final shape of the tip. A tip 152 in the range shown by L2 is arranged in a cylindrical shape having an outer diameter 5.0 mm and an inner diameter of 2.2 mm. As shown in FIG. 16, the L2 portion of this tip material is pressed from three directions by using a three nail chuck 161, 162 and 163 of a lathe, for example. In the case of making the radius of the rounding of the nail tip 164 3–5 mm, the internal surface of the hole becomes a hole 165 having a shape close to about a regular triangle circumscribing on a circle of 1.24±0.01 mm in diameter even without inserting a core wire therein, and it can be used as a current contact tip for a wire of 1.2 mm in diameter. As shown in FIG. 17, in the case that nail tips 177 and such are even, a hole shape 178 of the tip becomes a slightly expanding triangle at the middle of each side thereof. As shown in FIG. 16, in the case of setting the radius of the rounding to 3–5 mm, the outer circumference of the tip produces a convexity more or less, but the sides of the triangle in the internal surfaces take approximately a flat regular triangular shape.

According to the present process, the precision in the dimension of the hole may become worse more or less than that in the case of using the core wire described above, but the core wire does not need any processes for drawing and inserting the core wire, allowing the welding tips to be manufactured more economically.

Figure 6:
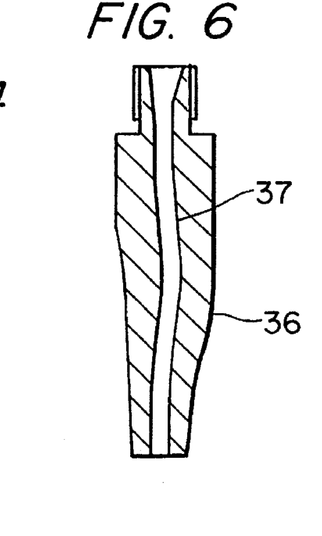
FIG. 6 is a sectional view showing a welding tip as a third preferred embodiment of the present invention.

Furthermore, in the case of the present process, the tip having the curved guide hole in the axial core direction of the tip illustrated in FIG. 6 can be easily prepared by combining concave and convex nails in the axial direction of the nail tip in respect to the tip shapes of three nails.

In the present preferred embodiment, the welding tip is prepared by pressing the whole of it by the three nails chuck at the same time. By using three rollers instead of the three-nail chuck, however, the tip can be similarly prepared by passing and crushing while rolling it in the lengthy direction of the tip.

Figure 4:
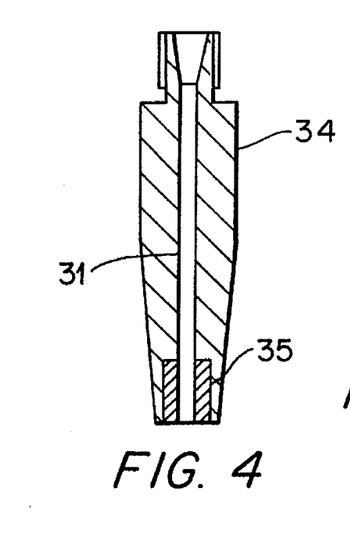
FIG. 4 is a sectional view showing a welding tip as a second preferred embodiment of the present invention.
Figure 5A:
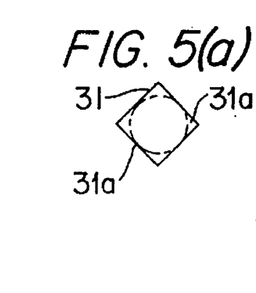
FIGS. 5(a), 5(b), 5(c), 5(d), and 5(e) are explanatory views illustrating various examples of a guide hole having a cross sectional shape.
Figures 5B, 5C:
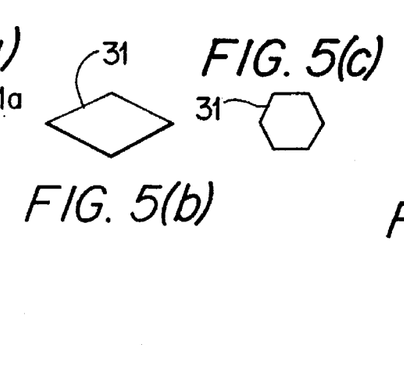
Figures 5D, 5E:
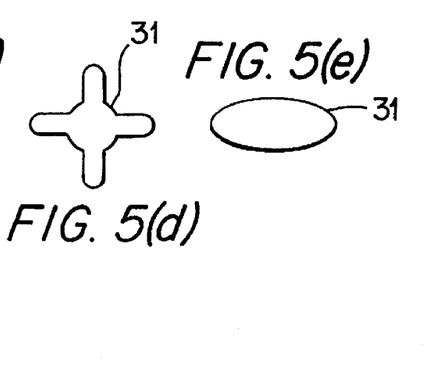

FIG. 4 is a sectional view showing a current contact tip as a second preferred embodiment of the present invention. An edge member 35 having a regular triangular guide hole 31 circumscribing on a circle of 1.25 mm in diameter, of 7 mm in length and 4 mm in outer diameter, and composed of a sintered alloy of Cu-W is embedded in the tip of the main body of a current contact tip 34. That is, a hole of 4 mm in diameter is provided on the outlet side of the current contact tip, where the edge member 35 is embedded in and fixed by clamping the outer circumference of the main body of the current contact tip 34. Thus, the service life of the current contact tip can be extended by embedding an abrasion resistant, conductive and hard material in the tip thereof. W and Ag-W may be used as the edge member 35 as well.

With reference to the dimensions of these inscribed circles, it happens eventually that a local and small deformation is presented to the wire for some reason. It may be necessary to increase the diameter of the inscribed circle in the guide hole more than a value obtained by adding 0.02 mm to the wire diameter in order to bring the possibility of the wire plugging-up due to such a local deformation to the degree that there is actually no problem. It may also be necessary to make this inscribed circle smaller than the diameter obtained by adding 0.20 mm to the wire diameter, in order to prevent the tip position of wire from fluctuating too much in practical use.

FIG. 6 shows the third preferred embodiment of the present invention. After preparing a current contact tip 36 in which a triangular guide hole was opened, a bent guide hole 37 is formed by bending the tip 36 at the center portion in the longitudinal direction of the tip of 40 mm in length, so that one of the ridge lines in the triangular guide hole may be apart from the central axis. As a result, when a straight wire passes through the tip 36, the wire can be pushed firmly against one corner in the triangular hole. As the wire is brought into contact with two points of the internal surface in the guide hole at the edge of the tip, the resulting current contact energizing is carried out more stably.

Figure 7:
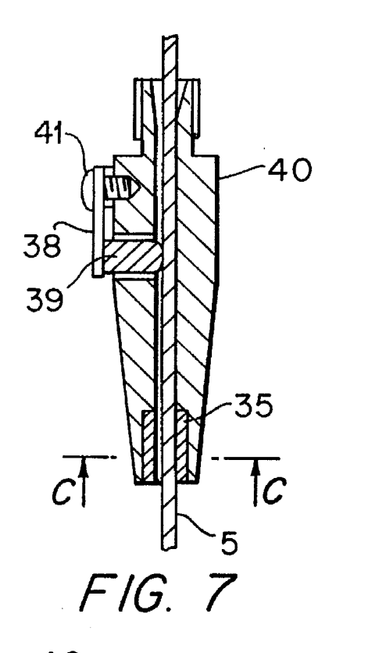
FIG. 7 is a sectional view showing a welding tip as a fourth preferred embodiment of the present invention.
Figure 8:
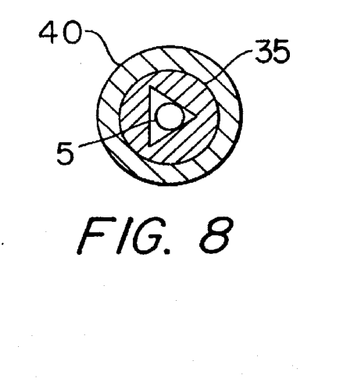
FIG. 8 is a sectional view of FIG. 7 taken along line C—C.

FIG. 7 shows the fourth preferred embodiment of the present invention. A welding tip 40 of the present embodiment is formed by embedding the edge member 35 having a triangular hole composed of a sintered alloy of Cu-W in the same manner as the case shown in FIG. 4 in the tip outlet. The wire 5 is pushed on by an abrasion resistant slider 39 through a plate spring 38 fixed at one end by a screw 41 so as to urge the wire to one corner of the triangular hole. The wire is brought into contact with the tip edge member 35 at two points thereof as shown in FIG. 8, and as the quantity of foreign matter clamped at the contact point decreases, the contact energizing is carried out with more stability and the generation of erratic arc is extremely decreased.

In the present embodiment, the service lifetime of the tip can be extended by using an abrasion resistant copper-tungsten material which is superior to chromium-copper material. Further, a straight wire 5 can be used to cause the contact energizing to be carried out forcedly by urging the wire 5 with the spring 38, extremely decreasing the fluctuation of the wire edge.

Figure 9:
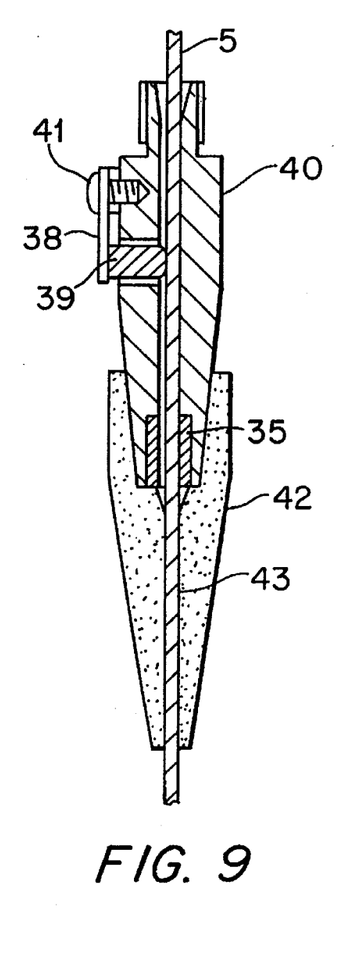
FIG. 9 is a sectional view showing a welding tip as a fifth preferred embodiment of the present invention.

FIG. 9 shows the fifth preferred embodiment of the present invention. The welding tip of the present embodiment is characterized by successively providing the edge member prepared from a heat resistant ceramic to the edge of the energizing tip 40 in FIG. 7. In FIG. 9, a numeral 42 indicates an edge member, a numeral 43 indicates a guide hole opened to the edge member 42, and identical numerals are the same as the corresponding portions shown in FIG. 7.

The guide hole 43 of 40 mm in length having a regular triangular shape in cross section circumscribing on a circle of 1.25 mm in diameter at its axial core portion is opened to the edge member 42 successively provided to the main body of the tip 40, and a mild steel wire of 1.2 mm in diameter is allowed to guide.

At the time of GMA welding, the arc is formed at the extension of the wire 5 by 10 mm from the wire outlet of the edge member 42. During welding, the wire 5 is heated by Joule heating due to arc current flowing in the wire passing through the guide hole 43 of the edge member 42, and is softened in the outlet of the edge member 42. While the softened wire 5 is passing through a straight guide hole 43, the curving tendency of the wire is eliminated and the resulting wire is fed out from the wire outlet of the edge member 42 in a straight condition. Incidentally, if the length of the guide hole 42 is insufficient, as the wire passes through the edge member 42 before it is not fully softened, it is not possible to fully eliminate the curving tendency of the wire 5. The length of the guide hole 42 which can correct sufficiently the curving tendency of the wire 5 depends upon the value of the arc current, but it may be enough if the length is 15 mm or more in the case that the arc current is about 250 A by using a mild steel wire. In the case of using the welding tip of the present invention, the zig zag of the bead due to the curving tendency of the wire 5 can be eliminated.

Referring now to a guide tip for hot wire TIG welding as an example, the detailed description of a manufacturing process for a welding tip composed of heat resistant ceramic will be given in the following. First of all, a core wire corresponding to a guide hole is prepared and then enclosed by alumina ($Al_2O_3$) powder. The enclosed core wire is placed in a rubber mold, pressed under a hydrostatic pressure of approximately 20 MPa to be hardened, and then the core wire of it taken out of it to give a green body, which is then precalcinated at approximately 1000° C., and the outer circumference mechanically processed into a tip shape. The resulting tip-like products are calcinated to give a tip. In the case of using the tip of the present embodiment in hot wire TIG welding, a high temperature wire can be positioned to a predetermined weld portion with high precision. Incidentally, alumina ($Al_2O_3$) is used as a ceramic in the present embodiment, although other materials such as silicon nitride ($Si_3N_4$) and mullite $3SiO_2$-$Al_2O_3$) may be used. Furthermore, the manufacturing process of the present example can be also applied to the manufacture of the edge member 42 of the fifth preferred embodiment described above.

The shape of the guide hole is not limited to the regular triangular shape in each preferred embodiment described above, but various shapes of the guide holes may be used. FIGS. 5A–5E illustrate alternative shapes in cross section for the guide hole. Each example of the guide holes is shown as follows: square, rhombus, hexagon, cruciform, and elliptical, respectively. Each of them has a face circumscribing on a circle having a larger diameter than the wire diameter by 0.02–0.20 mm and the clearance $31a$ for transferring the foreign matter formed along the wire. In each of the cases, the shape of the guide hole in the present example is excellent in the stabilization of the wire feeding, with diminishing wire fluctuation and improved carrier capacity for the foreign matter in comparison with those in the prior art.

Figure 18:
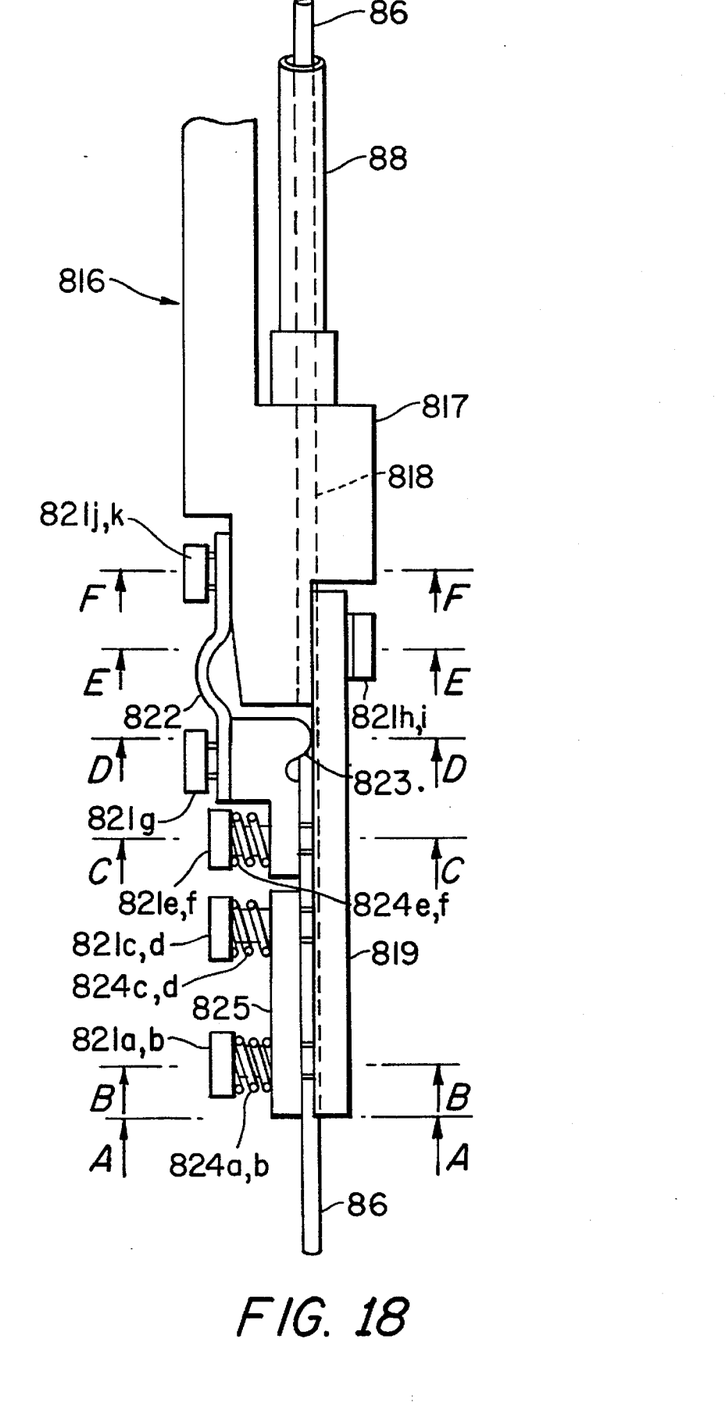
FIG. 18 shows a wire torch in a hot wire TIG welding machine wherein the present invention is applied.
Figure 18A:
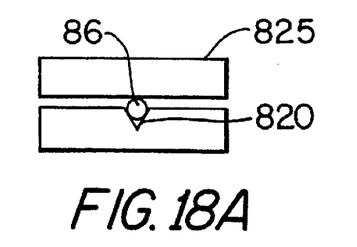
FIGS. 18A, 18B, 18C, 18D, 18E and 18F are sectional views taken along line A—A, B—B, C—C, D—D, E—E, and F—F of FIG. 18, respectively.
Figure 18B:
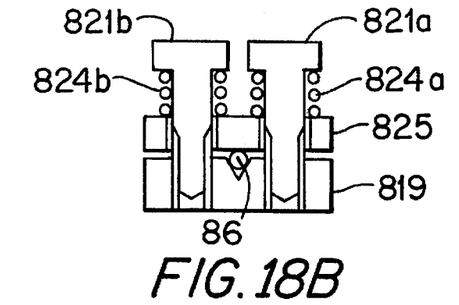
Figure 18C:
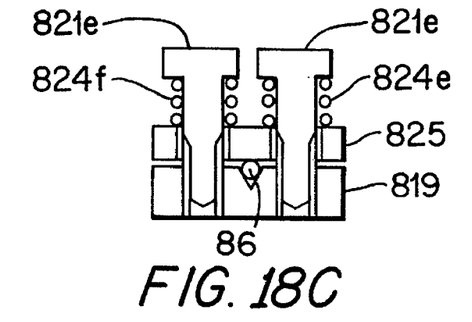
Figure 18D:
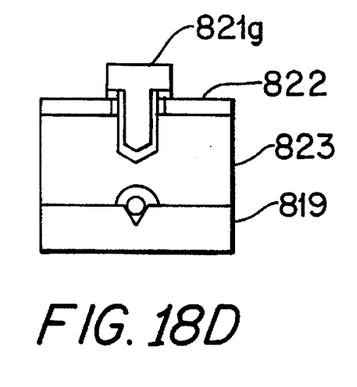
Figure 18E:
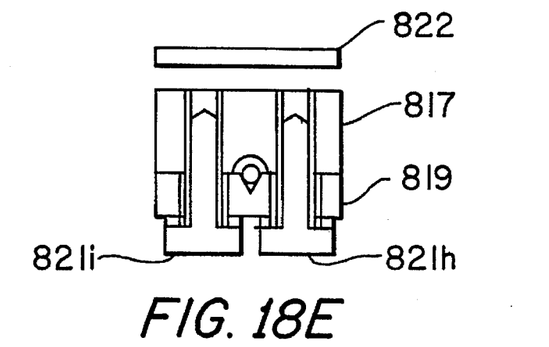
Figure 18F:
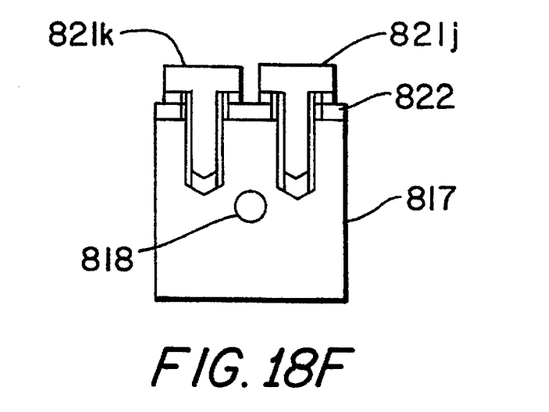

FIG. 18 shows a wire torch in a hot wire TIG welding machine to which a preferred embodiment of the present invention is applied. FIG. 18 illustrates a structure of a wire torch 816 for a hot wire. FIGS. 18A through 18F are sectional views taken along lines A—A through F—F of FIG. 18, respectively.

A wire 86 is supplied to a torch body 817 after passing through a conduit 88 from a unillustrated wire feeding apparatus. Then, the wire 86 reaches the tip of the wire torch 816 along a V channel 820 of a V channel member 819 after passing through a guide hole 818 in the torch body 817, and then it passes through the wire torch 816 and reaches a molten pool on a base metal. The V channel member 819 is composed of an insulating ceramic having heat and abrasion resistances, such as silicone nitride, and is fixed to torch body 817 by mounting screws $21h$ and $21j$.

The V channel 820 is in a form of a regular triangular having a depth between D and 1.4 D, where D is a diameter of the wire. Accordingly, when it is assumed as a triangular channel having a depth of 1.7 mm, a wire having a diameter of 1.2 mm or 1.6 mm may be used.

The torch body 817 is electrically connected to an output terminal of an unillustrated wire heating power source and energized to the wire 86 through a flexible energizing copper plate 822 and an energizing tip 823. The energizing tip 823 is pressed against the side of the V channel member 819 by means of screws 824e and 824f so as to firmly carry out current contact to the wire, and at the same time, to improve the service lifetime thereof in order to use it even though the energizing tip 823 may be worn more or less.

The tip of the wire 86 is touched with an unillustrated base metal and electrically heated between the tip 823 and the base metal. On its way, the wire 86 is heated at high temperatures and softened. An urging member 825 is composed of an insulated ceramic member having heat and abrasion resistance, such as silicone nitride. Then, the wire 86 having had a curving tendency is straightened in its soft state by these three side including the V channel 820, and the straightened wire 86 is fed out from the tip of the wire torch 816.

Furthermore, the present invention is not limited to wire torches for hot wire welding, but is also applicable to a consumable electrode provided with a shield nozzle such as that for MAG welding. Particularly in the case of MAG welding in the prior art, there was a disadvantage in that the bead zigzag was generated by the fluctuation of the arc position due to the wire curving tendencies of the wires, but according to the invention, the reproducibility of the welding work by a robot welding is remarkably increased, and the generation of the welding defects on the basis of bead zigzag is remarkably reduced.

Figure 19:
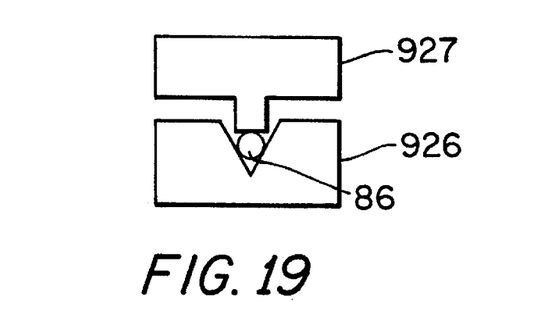
FIG. 19 is a sectional view showing a ceramic guide portion as an alternative preferred embodiment of the present invention.

In the present embodiment shown in FIG. 18, a triangular cross section is formed by the combination of the V channel with a plain surface. FIG. 19 is, however, a sectional view showing a ceramic guide portion as an alternative preferred embodiment, and a similar function can be exerted even with the cross section having such a shape that a convex portion of the urging member 927 enters into the V channel of a V channel member 926. The V channel in this case is in a form of a regular triangle of 1.7 D or 3 D in depth, if the wire diameter is assumed as D.

Figure 20:
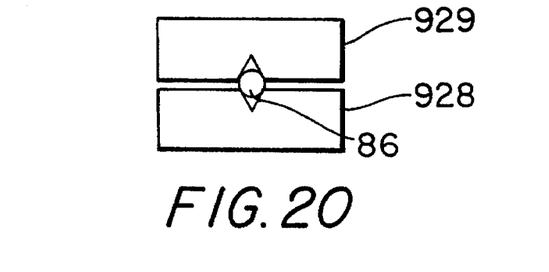
FIG. 20 is a sectional view showing a ceramic guide portion as another alternative preferred embodiment of the present invention.

FIG. 20 is a sectional view showing a ceramic guide portion as an alternative preferred embodiment, and the V channel member 928 and the urging member 929 are both rectangular V channels. Even though it may be close to the V channel and another shape, (for example, it may be a sectional shape such as a U channel, etc.), it may be included in the present invention insofar as the similar function can be exerted thereby.

According to the present invention, by use of the V channel, there is a problem that the structure of a tip portion becomes large and complicated, but the three sides of a triangle composed of a concave channel represented by a V channel and a plane surface are urged so as to be tightly contacted with the outer circumference of the wire. Therefore, there is the effect that the wire is corrected more straight and a wire insertion position is stabilized, resulting in stabilizing the welding work, in comparison with the case of employing the triangular hole ceramic tip having prepared so as to have an inscribed circle a larger diameter than the wire diameter.

Furthermore, in the case of a triangular hole tip, one tip is applied to only one public admitted wire diameter, but according to the welding tip assembly of the present invention, a selection range of the public admitted wire diameter which can be applied to the assembly is enlarged.

According to the present invention, the ceramic member having a concave channel can be prepared only by chipping the green body or it can be molded by a simple mold prepared inexpensively. In addition, the urging member may be in a form of a flat plate, and therefore, the preparation of it is easy. The permissible error range for preparation to be required to these members becomes considerably large in comparison with that in the case of the triangular hole ceramic tip, and the yield at the time of preparation is greatly improved.

The foreign matter such as deposits from copper-plating is released from the gap formed between the urging member and the concave member, and as a result, plugging-up trouble caused by the wires is avoided.

EFFECTS OF THE INVENTION

According to the present invention as described above, by making the guide hole of a welding tip non-circular, it is possible that even though smoothly passable wires having maximum diameter in the guide hole may be inserted therein, a large clearance is formed between the circumferential surface of the inserted wire and the internal surface of the guide hole, the rattle of the wire can be reduced and at the same time the accumulation of the foreign matter in the guide hole can be also decreased.

Furthermore, the wire can be brought into contact with at least two points on the internal surface of the guide hole and therefore, the resulting eneriziging can be applied with more stability in comparison with the case of the welding tip of a prior art having the round guide hole where the current contact was carried out at one point.

What is claimed is:

1. A welding wire-guiding tip having a guide hole for a wire having a circular cross section, wherein said guide hole has a cross-sectional shape that is exactly three-sided, the cross-section being taken perpendicular to the guide hole and looking along the axis of the guide hole.

2. A welding wire-guiding tip according to claim 1, wherein the three-sided cross-sectional shape circumscribes a circle having a larger diameter than the outer diameter of the wire to be inserted into said guide hole by 0.02–0.20 mm.

3. A welding wire-guiding tip according to claim 2, wherein said guide hole is arranged to have a space for allowing a circle having a diameter corresponding to more than one-third of the outer diameter of said wire to inscribe two faces of the guide hole and the circumferential face of said wire when the wire is passed through said guide hole, and the circumferential face of said wire is exactly brought into contact with two faces of said guide hole.

4. A welding wire-guiding tip according to claim 1, wherein said guide hole is arranged to have a space for allowing a circle having a diameter corresponding to more than one-third of the outer diameter of said wire to inscribe two faces of the guide hole and the circumferential face of said wire when the wire is passed through said guide hole, and the circumferential face of said wire is exactly brought into contact with two faces of said guide hole.

5. A welding wire-guiding tip according to claim 1, further comprising a main body and an edge member including a heat-resistant ceramic of 15 mm or more in length successively connected to said main body; wherein said guide hole is opened both in the main body of the tip and in said edge member.

6. A welding wire-guiding tip according to claim 5, wherein the three-sided cross-sectional shape circumscribes a circle having a larger diameter than the outer diameter of the wire to be inserted into said guide hole by 0.02–0.05 mm.

7. In a welding device having a welding wire-guiding tip, the improvement wherein the welding wire-guiding tip has a guide hole for receiving a welding wire of circular cross-section, and wherein said sectional guide hole has a cross-sectional shape of exactly thee sides, the cross-section being taken perpendicular to the guide hole and looking along the axis of the guide hole.

8. A welding device according to claim 7, wherein the three-sided cross-section of the guide hole circumscribes a circle having a larger diameter than the outer diameter of the wire to be inserted into said guide hole by 0.02–0.20 mm.

9. A welding device according to claim 8, wherein the welding wire-guiding tip further comprises a main body and an edge member including a heat-resistant ceramic of 15 mm or more in length successively connected to said main body; wherein said guide hole is opened both in the main body of the tip and in said edge member.

10. A welding device according to claim 7, wherein said guide hole is arranged to have a space for allowing a circle having a diameter corresponding to more than one-third of the outer diameter of said wire to inscribe two faces of the guide hole and the circumferential face of said wire when the wire is passed through said guide hole, and the circumferential face of said wire is exactly brought into contact with two faces of said guide hole.

11. A welding device according to claim 7, wherein the welding wire-guiding tip further comprises a main body and an edge member including a heat-resistant ceramic of 15 mm or more in length successively connected to said main body; wherein said guide hole is opened both in the main body of the tip and in said edge member.

12. A welding device according to claim 11, wherein the three-sided cross-sectional shape circumscribes a circle having a larger diameter than the outer diameter of the wire to be inserted into said guide hole by 0.02–0.05 mm.

13. A welding device according to claim 7, wherein the three-sided cross-sectional shape circumscribes a circle having a larger diameter than the outer diameter of the wire to be inserted into said guide hole by 0.02–0.05 mm.

14. A welding wire-guiding tip according to claim 1, wherein the three-sided cross-sectional shape circumscribes a circle having a larger diameter than the outer diameter of the wire to be inserted into said guide hole by 0.02–0.05 mm.

15. A welding wire-guiding tip according to claim 1, wherein the guide hole is formed in a portion of the tip that is entirely constituted by copper or a copper alloy.

16. A welding wire-guiding tip according to claim 15, wherein the center line of said guide hole in the traveling direction of said wire is curved so that said wire is in firm sliding contact with the internal surface of said guide hole.

17. A welding wire-guiding tip according to claim 1, wherein said guide hole is formed in a portion of the tip that is entirely constituted by a heat-resistant ceramic.

18. A welding wire-guiding tip manufactured by a process comprising the following steps:
preparing a cylindrical material of copper or copper alloy;
inserting a core wire of noncircular cross-section into said cylindrical material;
pressing said cylindrical material to said core wire on the internal surface thereof by applying an outer force to the cylindrical material; and
drawing said core wire out of said material.

19. A welding wire-guiding tip manufactured by a process comprising the following steps:
preparing a cylindrical material of copper or copper alloy, with a hole through the cylindrical material; and
applying an outer force from three different lateral directions to said cylindrical material simultaneously to make the cross-sectional configuration of said hole into an approximate triangular shape.

20. A welding wire-guiding tip having a guide hole for a wire having a circular cross section, wherein said guide hole has a cross-sectional shape that is generally triangular, the cross-section being taken perpendicular to the axis of the guide hole and looking along the axis of the guide hole, wherein the generally triangular cross-sectional shape circumscribes a circle having a larger diameter than the outer diameter of the wire to be inserted into said guide hole by 0.02–0.20 mm.

21. A welding wire-guiding tip according to claim 20, wherein said guide hole is arranged to have a space for allowing a circle having a diameter corresponding to more than one-third of the outer diameter of said wire to inscribe two faces of the guide hole and the circumferential face of said wire when the wire is passed through said guide hole, and the circumferential face of said wire is exactly brought into contact with two faces of said guide hole.

22. A welding wire-guiding tip according to claim 21, wherein the generally triangular cross-sectional shape circumscribes a circle having a larger diameter than the outer diameter of the wire to be inserted into said guide hole by 0.02–0.05 mm.

23. A welding wire-guiding tip according to claim 20, further comprising a main body and an edge member including a heat-resistant ceramic of 15 mm or more in length successively connected to said main body; wherein said guide hole is opened both in the main body of the tip and in said edge member.

24. A welding wire-guiding tip according to claim 20, wherein the generally triangular cross-sectional shape circumscribes a circle having a larger diameter than the outer diameter of the wire to be inserted into said guide hole by 0.02–0.05 mm.

25. In a welding device having a welding wire-guiding tip, the improvement wherein the welding wire-guiding tip has a guide hole for receiving a welding wire of circular cross-section, wherein said sectional guide hole has a generally triangular cross-sectional shape, the cross-section being taken perpendicular to the axis of the guide hole and looking along the axis of the guide hole, and wherein the generally triangular cross-section of the guide hole circumscribes a circle having a larger diameter than the outer diameter of the wire to be inserted into said guide hole by 0.02–0.20 mm.

26. A welding device according to claim 25, wherein said guide hole is arranged to have a space for allowing a circle having a diameter corresponding to more than one-third of the outer diameter of said wire to inscribe two faces of the guide hole and the circumferential face of said wire when the wire is passed through said guide hole, and the circumferential face of said wire is exactly brought into contact with two faces of said guide hole.

27. A welding device according to claim 25, wherein the welding wire-guiding tip further comprises a main body and an edge member including a heat-resistant ceramic of 15 mm or more in length successively connected to said main body; wherein said guide hole is opened both in the main body of the tip and in said edge member.

28. A welding device according to claim 25, wherein the generally triangular cross-sectional shape circumscribes a circle having a larger diameter than the outer diameter of the wire to be inserted into said guide hole by 0.02–0.05 mm.

29. A welding wire-guiding tip assembly, comprising:
a heat-resistant and anti-abrasive ceramic guide member having a V channel; and
a ceramic member for contacting and urging a wire in the V channel so that the wire is supplied along the V channel, said ceramic guide member and said ceramic member together defining a generally triangular wire guide hole with said V channel;

wherein the length of said guide hole is greater than or equal to 15 mm.

30. A welding wire-guiding tip assembly according to claim 29, further comprising a wire energizing tip provided on a wire inlet side of said assembly downstream of said ceramic member, said wire energizing tip contacting the wire in the V channel so that the wire contacts the walls of the V channel to carry out a contact energizing.

31. In a welding device having a welding wire-guiding tip assembly, the improvement wherein the welding wire-guiding tip assembly comprises:

a heat resistant and anti-abrasive ceramic guide member provided with a V channel; and a ceramic member for contacting a wire with a V channel so that said wire may be supplied along said V channel, said two members constituting a generally triangular wire guide hole.

* * * * *